(12) United States Patent
Itoga et al.

(10) Patent No.: US 7,481,452 B2
(45) Date of Patent: Jan. 27, 2009

(54) OCCUPANT PROTECTION DEVICE

(75) Inventors: Yasuo Itoga, Hikone (JP); Hiromichi Yoshikawa, Hikone (JP); Masayoshi Kumagai, Shiga (JP)

(73) Assignee: Takata Corporation (JP)

( * ) Notice: Subject to any disclaimer, the term of this patent is extended or adjusted under 35 U.S.C. 154(b) by 171 days.

(21) Appl. No.: 11/067,227

(22) Filed: Feb. 25, 2005

(65) Prior Publication Data
US 2005/0189749 A1    Sep. 1, 2005

(30) Foreign Application Priority Data
Feb. 27, 2004    (JP)    ............................. 2004-054307

(51) Int. Cl.
*B60R 21/018*    (2006.01)
(52) U.S. Cl. .................. 280/733; 280/728.2; 280/730.1
(58) Field of Classification Search ................. 280/733, 280/729, 730.1, 741, 742, 728.2; 297/216.1; 180/268
See application file for complete search history.

(56) References Cited

U.S. PATENT DOCUMENTS

| | | | | |
|---|---|---|---|---|
| 3,314,719 A | * | 4/1967 | Johnson | 297/481 |
| 3,682,498 A | * | 8/1972 | Rutzki | 280/733 |
| 3,820,842 A | * | 6/1974 | Stephenson | 280/733 |
| 3,970,329 A | * | 7/1976 | Lewis | 280/733 |
| 5,082,326 A | * | 1/1992 | Sekido et al. | 297/284.6 |
| 5,313,690 A | * | 5/1994 | Hiramatsu et al. | 24/641 |
| 5,383,713 A | * | 1/1995 | Kamiyama et al. | 297/471 |
| 5,947,514 A | * | 9/1999 | Keller et al. | 280/742 |
| 6,135,563 A | * | 10/2000 | Yoshioka | 297/470 |
| 6,168,195 B1 | * | 1/2001 | Okazaki et al. | 280/733 |
| 6,276,715 B1 | * | 8/2001 | Takeuchi | 280/733 |
| 6,340,173 B1 | * | 1/2002 | Specht | 280/733 |
| 6,406,058 B1 | * | 6/2002 | Devonport et al. | 280/733 |
| 6,409,212 B1 | * | 6/2002 | Wier | 280/733 |
| 6,419,264 B1 | * | 7/2002 | Tsuji et al. | 280/733 |
| 6,523,856 B2 | * | 2/2003 | Braun et al. | 280/733 |
| 6,565,121 B2 | * | 5/2003 | Knych et al. | 280/806 |
| 6,715,788 B2 | * | 4/2004 | Saiguchi et al. | 280/730.1 |
| 6,863,298 B2 | * | 3/2005 | Sakai et al. | 280/728.1 |

(Continued)

FOREIGN PATENT DOCUMENTS

DE    19943595 A1    3/2001

(Continued)

*Primary Examiner*—Paul N. Dickson
*Assistant Examiner*—Timothy Wilhelm
(74) *Attorney, Agent, or Firm*—Fitch, Even, Tabin & Flannery

(57) ABSTRACT

An occupant protection device is provided which protects an occupant by inflating a seat bag and a lap bag. When a vehicle collision is detected, gas generators are activated and discharge gas. The gas from one of the gas generators inflates a tube. As a result, a front portion of a cushion pad of a seat cushion is pushed upward or hardened and the hips of the occupant are prevented from moving forward. A lap bag also inflates and restrains the hips of the occupant. In one form, a lap anchor inflates so that pretension is applied to a lap portion and the hips of the occupant are pushed downward. Therefore, the thighs and hips of the occupant are pushed between the lap portion and the front portion of the cushion pad which is pushed upward or hardened and are strongly restrained in the seat.

15 Claims, 7 Drawing Sheets

U.S. PATENT DOCUMENTS

| | | | |
|---|---|---|---|
| 6,935,684 B2 * | 8/2005 | Sakai ....................... 297/216.1 |
| 7,168,742 B2 * | 1/2007 | Tomita ....................... 280/806 |
| 2001/0011810 A1 | 8/2001 | Saiguchi et al. |
| 2002/0105175 A1 * | 8/2002 | Lewis et al. ................. 280/733 |
| 2003/0230872 A1 * | 12/2003 | Sakai et al. ............... 280/728.1 |
| 2004/0041390 A1 * | 3/2004 | Tomita ....................... 280/806 |
| 2004/0113413 A1 * | 6/2004 | Go ............................ 280/808 |
| 2004/0155436 A1 * | 8/2004 | Saiguchi et al. .......... 280/728.1 |
| 2004/0178616 A1 * | 9/2004 | Yoshikawa ................. 280/748 |
| 2005/0104341 A1 * | 5/2005 | Sakai ....................... 280/730.1 |
| 2006/0076760 A1 * | 4/2006 | Itoga ......................... 280/733 |

FOREIGN PATENT DOCUMENTS

| | | |
|---|---|---|
| EP | 1 371 518 A | 12/2003 |
| GB | 2 332 884 A | 7/1999 |
| JP | 5-229378 | 9/1993 |
| JP | 10-217818 | 8/1998 |
| JP | 2002-79861 | 3/2002 |
| JP | 2002-79862 | 3/2002 |
| JP | 2002-79863 | 3/2002 |
| JP | 2002-145002 | 5/2002 |
| JP | 2003-312439 | 11/2003 |
| JP | 2004-98753 | 4/2004 |

* cited by examiner

FIG. 7(a)
LAP BAG
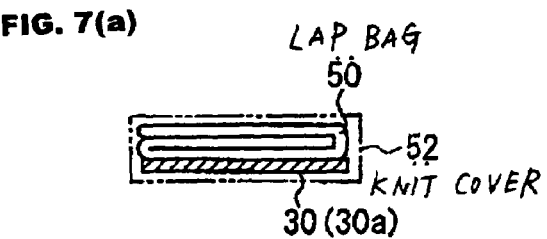
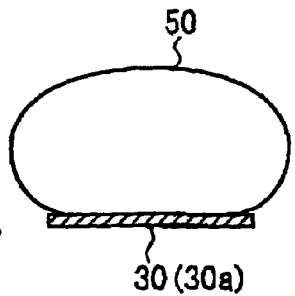
FIG. 7(b)
FIG. 8(a)
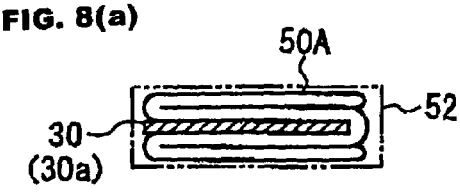
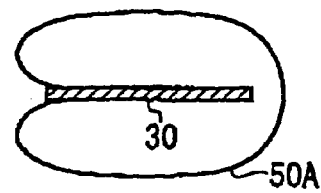
FIG. 8(b)
FIG. 9(a)
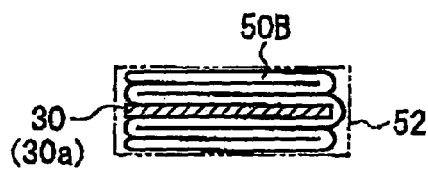
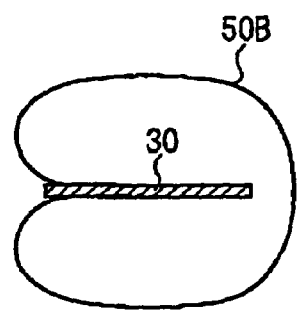
FIG. 9(b)
FIG. 10(a)
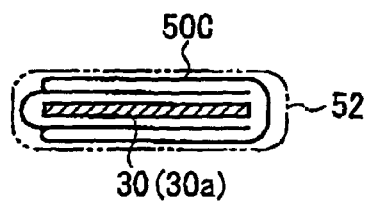
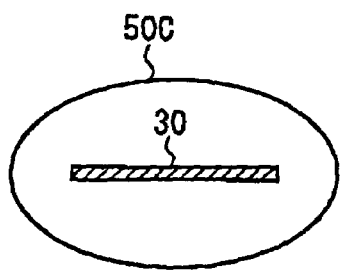
FIG. 10(b)

OCCUPANT PROTECTION DEVICE

FIELD OF THE INVENTION

The present invention relates to occupant protection devices for protecting occupants in seats of vehicles, such as automobiles, in case of a collision, and more specifically relates to an occupant protection device configured to prevent the body of an occupant from moving forward when a vehicle collides from the front.

BACKGROUND OF THE INVENTION

As a system for protecting an occupant of an automobile in case of a collision, a device for raising a front portion of a seat cushion when the vehicle collides has been proposed to prevent a submarine phenomenon in which the occupant wearing a seatbelt moves through a space below a lap belt when the vehicle collides from the front. For example, Japanese Unexamined Patent Application Publication No. 10-217818 discloses a vehicle seat having an airbag for pushing the front end portion of a seat cushion upward.

On the other hand, an air belt device (inflatable seatbelt device) is known as an occupant protection device (for example, Japanese Unexamined Patent Application Publication No. 2003-312439). In an air belt device according to this publication, both a shoulder belt and a lap belt are inflatable, and gas supplied from a gas generator provided on a buckle is injected into the inflatable shoulder belt and the lap belt through a tongue.

In addition, Japanese Unexamined Patent Application Publication No. 2002-145002 discloses an occupant protection device which protects an occupant by inflating a seat bag provided in front of a seat back, a shoulder belt, and a lap belt. According to Japanese Unexamined Patent Application Publication No. 2002-145002, the seat bag provided at the front portion of the seat, the shoulder belt, and the lap belt are inflated using a single gas generator.

In the occupant protection device according to Japanese Unexamined Patent Application Publication No. 2002-145002, the inflatable shoulder belt and the lap belt are connected to different tongues at one end thereof, and are latched to a buckle device with their respective tongues. Each of the buckle device and the tongues is provided with a gas supply path for supplying the gas from the gas generator to the shoulder belt and the lap belt.

The occupant protection devices according to Japanese Unexamined Patent Application Publication Nos. 2003-312439 and 2002-145002 must include tongues having gas supply paths, gas generators, buckle devices having gas-injecting paths for receiving gas from the gas generators, couplers for detachably coupling the gas supply paths of the tongues to the gas-injecting paths of the buckle devices, etc., and the tongue-buckle mechanisms are complex. In addition, covers for preventing foreign bodies, such as dust, from entering the gas supply paths and the gas-injecting paths when the couplers are in an unconnected state must be provided, and the structures are complex.

SUMMARY OF THE INVENTION

An object of the present invention is to simplify a mechanism of an occupant protection device which protects an occupant by inflating a seat bag provided in front of a seat back and a lap bag.

According to one form of the present invention, an occupant protection device includes a seat provided with a seat cushion and a seat back; an inflatable seat bag disposed inside or under a front portion of the seat cushion; a seat-bag gas generator for inflating the seat bag in case of emergency; a buckle device; a tongue capable of being attached to the buckle device; a webbing extending through the tongue; a lap anchor which secures the webbing at one end of the webbing; a retractor for retracting the webbing at the other end of the webbing; an inflatable lap bag provided at a lap portion of the webbing; and a lap-bag gas generator for inflating the lap bag in case of emergency, the lap-bag gas generator being provided near the lap anchor.

According to another form, in the occupant protection device, the lap anchor and the lap-bag gas generator are attached to a common attachment member.

According to the occupant protection device in these forms, in case of emergency, such as a vehicle collision, the gas generators are activated and the bag inflates so that the front portion of the seat cushion is pushed upward or a portion in contact with this bag is compressed by being pushed from below and hardens. Accordingly, the submarine phenomenon of the occupant is prevented. In addition, the lap bag inflates to restrain the occupant.

In another aspect, in the occupant protection device according to these forms, since the lap-bag gas generator is provided near the lap anchor, it is not necessary to provide gas paths in the tongue and the buckle. Accordingly, a cover for preventing foreign bodies from entering the gas supply paths is also not necessary, and the structures of the tongue and the bag are made simpler. In addition, the timings at which the lap bag and the shoulder bag inflates and the internal pressures during inflation can be controlled individually.

In the occupant protection device according to the form including the common attachment member, the attachment structure of the lap anchor and the lap-bag gas generator is made simpler.

BRIEF DESCRIPTION OF THE DRAWINGS

FIGS. 7(a) and 7(b) are diagrams showing the structure of a lap bag.

FIGS. 8(a) and 8(b) are diagrams showing the structure of another lap bag.

FIGS. 9(a) and 9(b) are diagrams showing the structure of another lap bag.

FIGS. 10(a) and 10(b) are diagrams showing the structure of another lap bag.

DETAILED DESCRIPTION OF THE PREFERRED EMBODIMENTS

Figure 1:
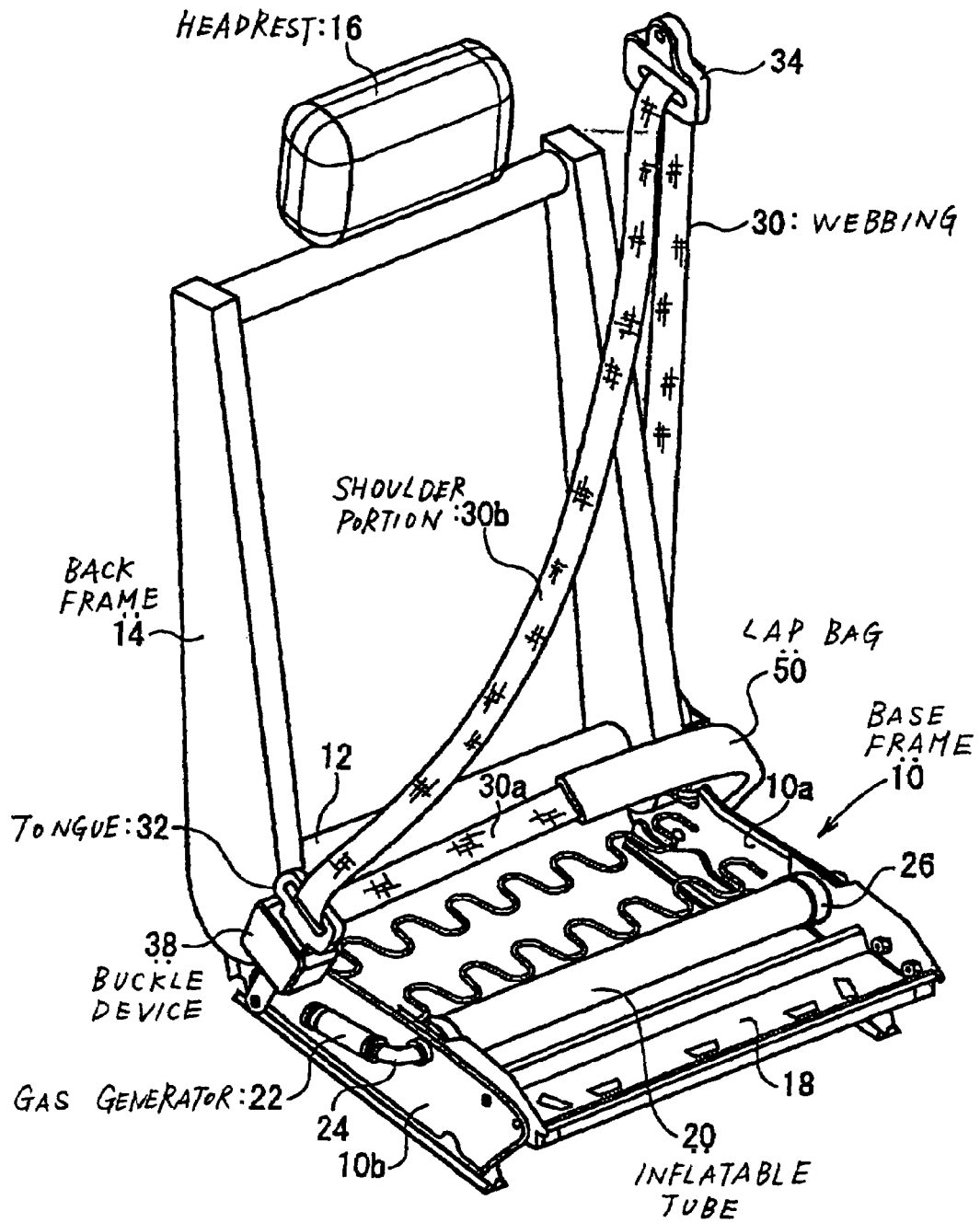
FIG. 1 is a perspective view of a seat frame provided with an occupant protection device according to an embodiment.
Figure 2:
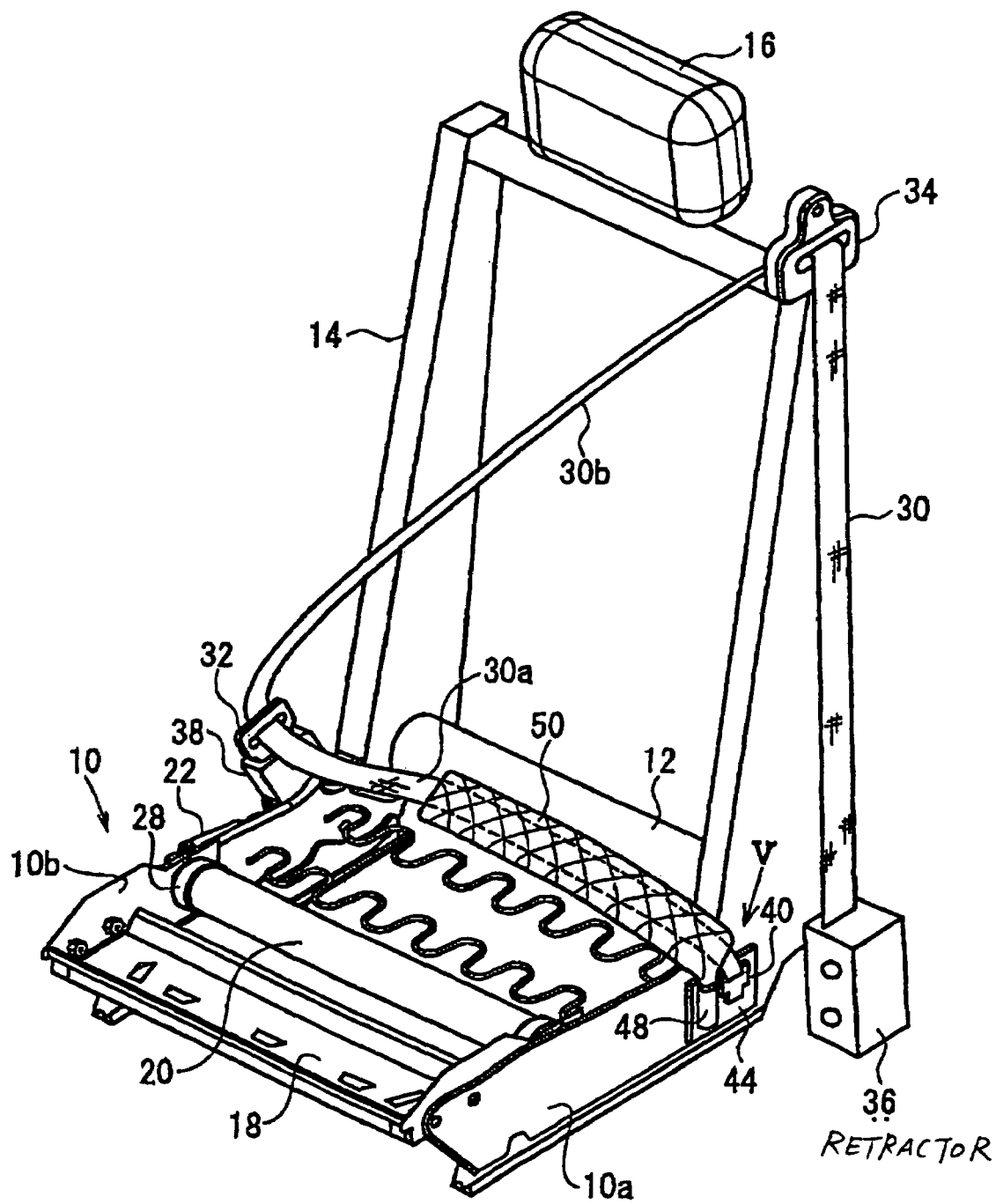
FIG. 2 is a perspective view of the seat frame from the side opposite to FIG. 1.
Figure 3:
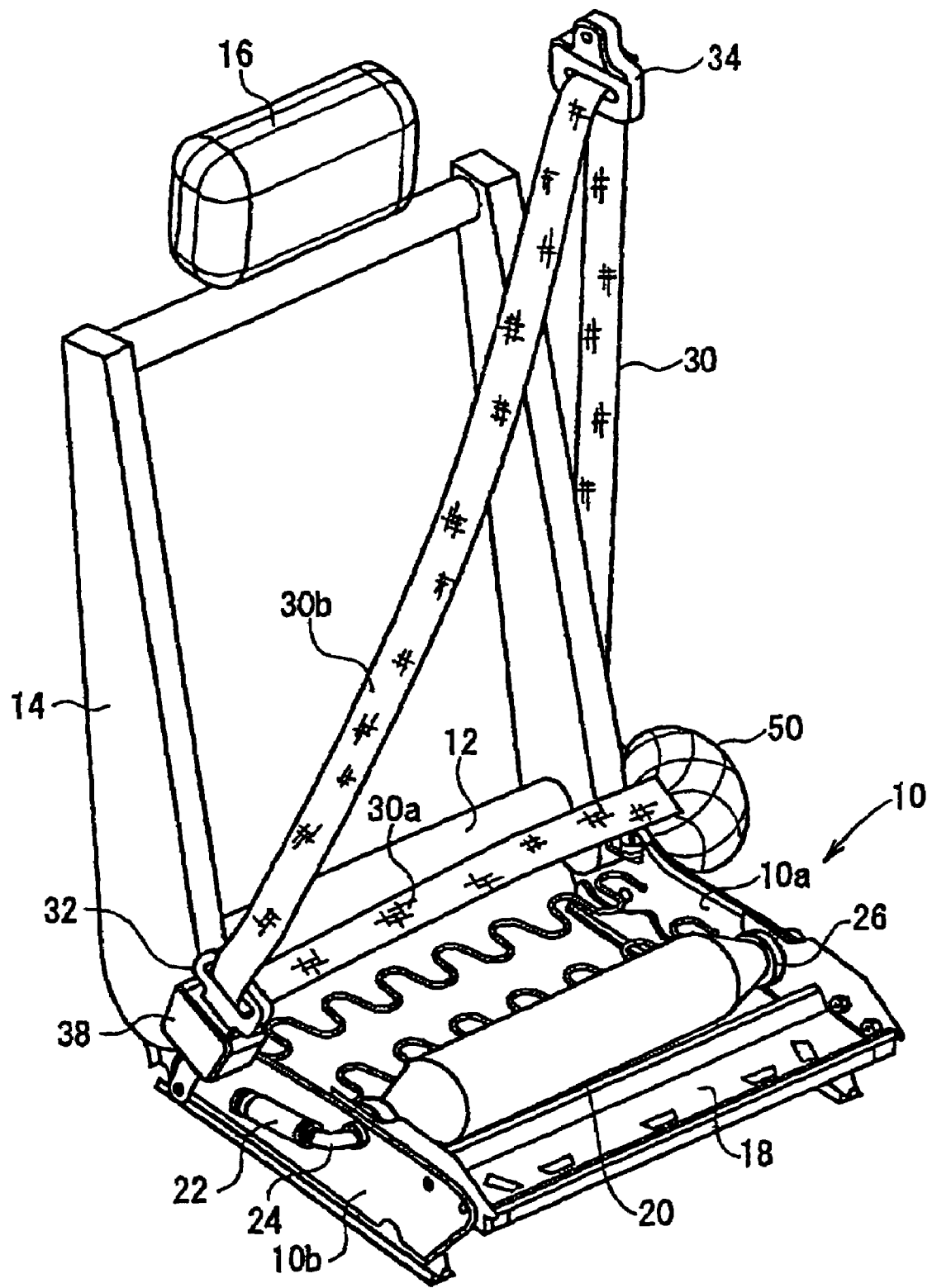
FIG. 3 is a perspective view of the seat frame from the same direction as FIG. 1 in the state in which a tube, etc., are inflated.
Figure 4:
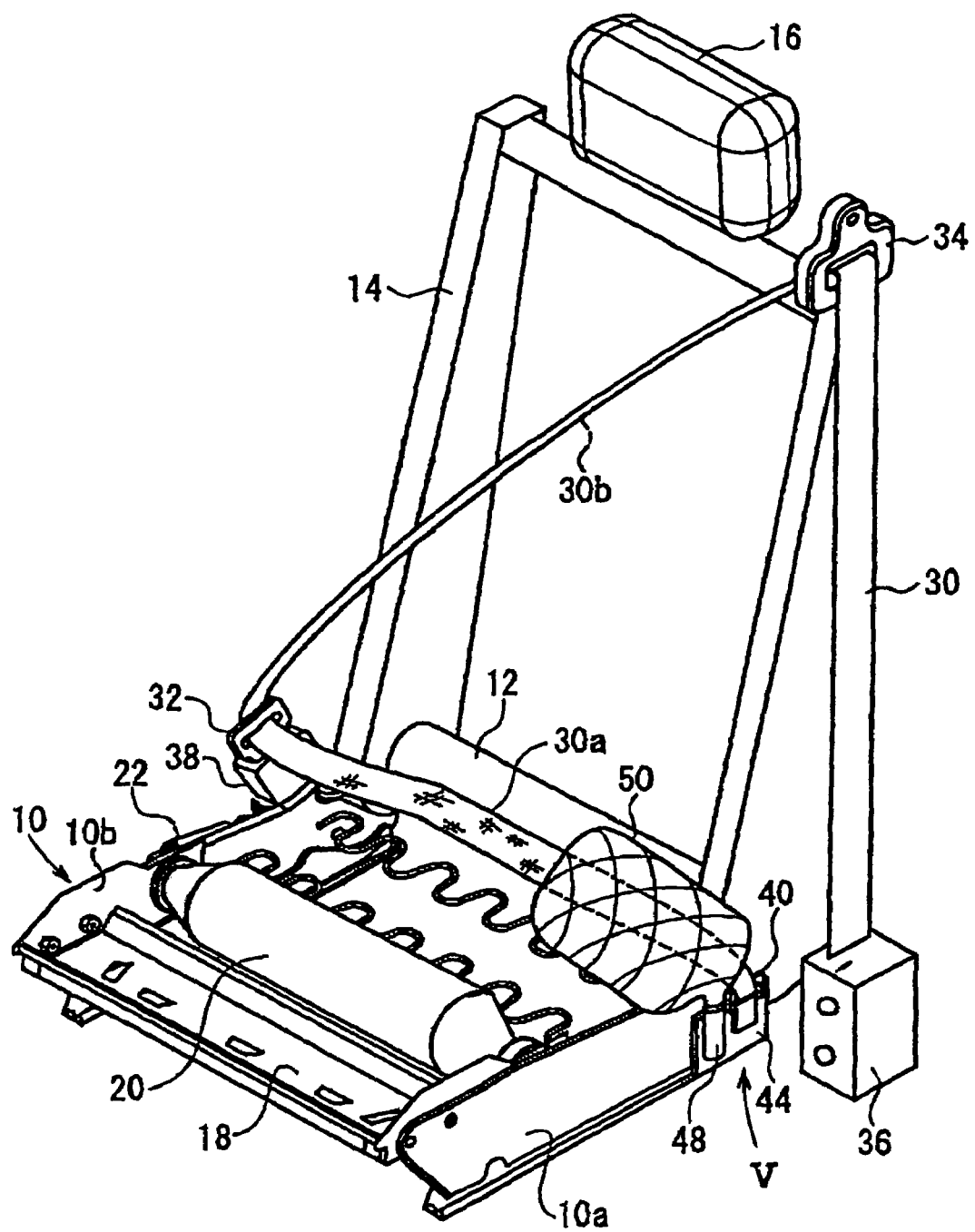
FIG. 4 is a perspective view of the seat frame from the side opposite to FIG. 3.
Figure 5:
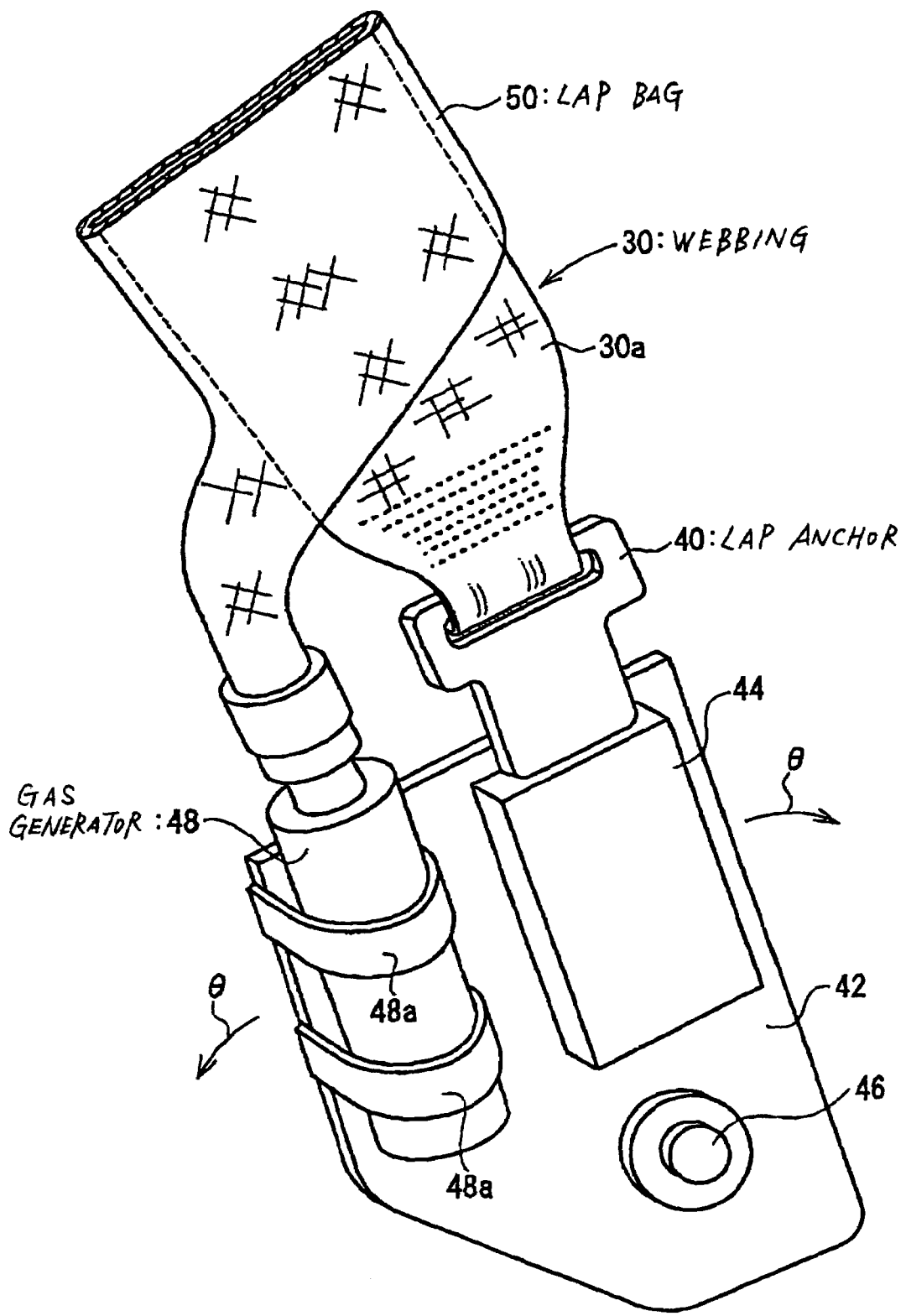
FIG. 5 is a perspective view of a part around a lap anchor.

Next, embodiments of the present invention will be described below with reference to the accompanying drawings. FIGS. 1 to 4 are perspective views showing a seat frame unit having an occupant protection device according to an embodiment of claim 1 of the present invention, and FIG. 5 is an enlarged sectional view of a part indicated by V in FIG. 2. FIGS. 7(a) and 7(b) are sectional views of a lap bag. FIGS. 1, 2, and 5 show a state in which an inflator (gas generator) is not yet activated, and FIGS. 3 and 4 show a state in which the inflator is activated.

A frame unit of a vehicle seat includes a base frame 10 and a back frame 14 which is rotatably connected to the base frame 10 with a support shaft 12 and a reclining device (not shown) disposed therebetween. A headrest 16 is attached at the top of the back frame 14.

The base frame 10 includes left and right side frame members 10a and 10b and a seat pan 18 interconnecting the side frame members 10a and 10b.

An inflatable tube (hereafter simply called a tube) 20 is stretched between the side frame members 10a and 10b at a position above the seat pan 18.

Although not shown in the figures, the tube 20 includes a bag which is folded into a thin, long shape and a tubular mesh webbing which covers the folded bag. The mesh webbing is made of textile fabric which flexibly extends and contracts in the radial direction but barely extends in the longitudinal direction (lateral direction of the seat).

As shown in FIGS. 1 to 4, one end of the tube 20 is connected to the side frame member 10a with an attachment 26, and the other end of the tube 20 is connected to the side frame member 10b with an attachment 28.

A gas generator 22 is provided along the outer side of the side frame member 10b. The gas generator 22 communicates with the tube 20 via a pipe 24. The gas generator 22 may also be disposed in the tube 20 and extend along the tube 20.

A webbing 30 extends along the front side of the back frame 14. The webbing 30 includes a lap portion 30a which extends from a tongue 32 along the lap of an occupant and a shoulder portion 30b which extends from the tongue 32 toward the shoulder of the occupant.

The shoulder portion 30b extends through a shoulder anchor 34, and a rear end of the shoulder portion 30b can be retracted by a seatbelt retractor 36. The tongue 32 can be attached to a buckle device 38.

The lap portion 30a is connected to a lap anchor 40 at an end thereof. As shown in the enlarged view of FIG. 5, the lap anchor 40 projects from a pretensioner 44 provided on a base plate 42. The pretensioner 44 pulls the lap anchor 40 downward and applies tension to the lap portion 30a in case of a vehicle emergency.

The base plate 42 is attached to the side frame member 10a with an attachment shaft 46 such that the base plate 42 can rotate in the direction shown by θ in FIG. 5.

A gas generator 48 for inflating a lap bag 50 is attached to the base plate 42 with fixing members 48a. In the present embodiment, the base plate 42 functions as a common attachment member to which both the lap anchor 40 and the gas generator 48 are attached.

The lap bag 50 is disposed along the lap portion 30a of the webbing 30 at a position near the lap anchor 40, and is seamed onto the webbing 30. As shown in FIG. 7(a), the lap bag 50 has a large width and is folded into a long band-like shape with substantially the same width as the webbing 30.

The webbing 30 and the lap bag 50 are covered with a knit cover 52. The knit cover 52 flexibly extends and contracts in the width direction but is subjected to a heat-drawing process so that it barely extends in the longitudinal direction.

When gas is supplied to the lap bag 50, the knit cover 52 inflates together with the lap bag 50. At this time, the length of the knit cover 52 in the longitudinal direction is reduced. More specifically, since the knit cover 52 barely extends in the longitudinal direction due to the heat-drawing process, when the lap bag 50 inflates, knit loops in the knit cover 52 extend in the lateral direction and the knit cover 52 contracts in the longitudinal direction as a result. Accordingly, the length of the lap bag 50 in the longitudinal direction is reduced and the webbing 30 comes into tight contact with the occupant.

Although not shown in the figures, a cushion pad and a back pad made of urethane or the like are attached to the base frame 10 and the back frame 14, respectively.

The tube 20 is placed under the cushion pad.

In the occupant protection device according to the present embodiment, the lap bag 50 receives gas supplied from the gas generator 48 which is provided near the lap anchor 40. As shown in FIG. 5, the lap bag 50 is connected to the gas generator 48 at an end thereof. The tongue 32 and the buckle device 38 are not provided with a gas supply path or a gas-injecting path for injecting gas from the gas generator into the lap bag, a coupler for detachably coupling the paths, etc. Therefore, the structures of the tongue 32 and the buckle device 38 are simple.

In the present embodiment, the lap anchor 40 and the gas generator 48 are both attached to the base plate 42, and accordingly they can be easily attached to the base frame 10.

Next, the operation of the occupant protection device will be described below.

When a vehicle collision from the front is detected, the gas generators 22 and 48 are activated and discharge gas. The gas from the gas generator 22 flows into the tube 20 via the pipe 24 and inflates the tube 20. As a result, the front portion of the cushion pad of the seat cushion is pushed upward or hardened and the hips of the occupant is prevented from moving forward.

In addition, the lap bag 50 also inflates and restrains the hips of the occupant. More specifically, since the inflated lap bag 50 is placed between the side wall (the door, etc.) of the vehicle cabin and the occupant during the collision, the hips of the occupant are reliably prevented from moving toward the side wall of the vehicle cabin. The lap bag 50 also functions as a buffer when the side wall of the vehicle cabin enters the cabin toward the occupant. In addition, the pretensioner 44 pulls the lap anchor 40 downward and the lap anchor 40 inflates so that the length of the lap anchor 40 is reduced. Accordingly, pretension is applied to the lap portion 30a and the hips of the occupant are pushed downward.

Therefore, the thighs and hips of the occupant are pushed between the lap portion 30a and the front portion of the cushion pad which is pushed upward or hardened and are strongly restrained in the seat.

Figure 6A:
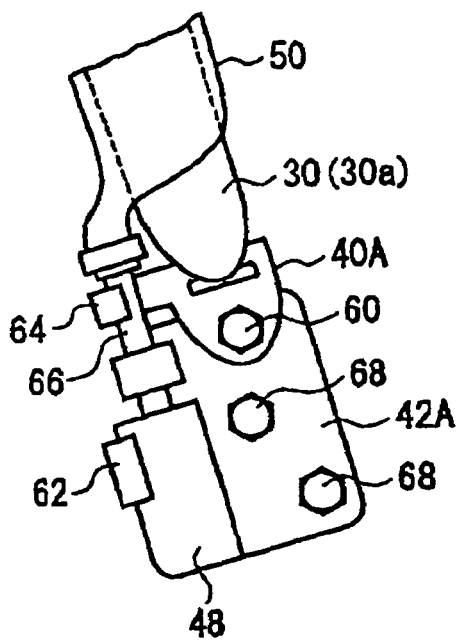
FIG. 6(a) is a diagram showing a structure around a lap anchor according to another embodiment.
Figure 6B:
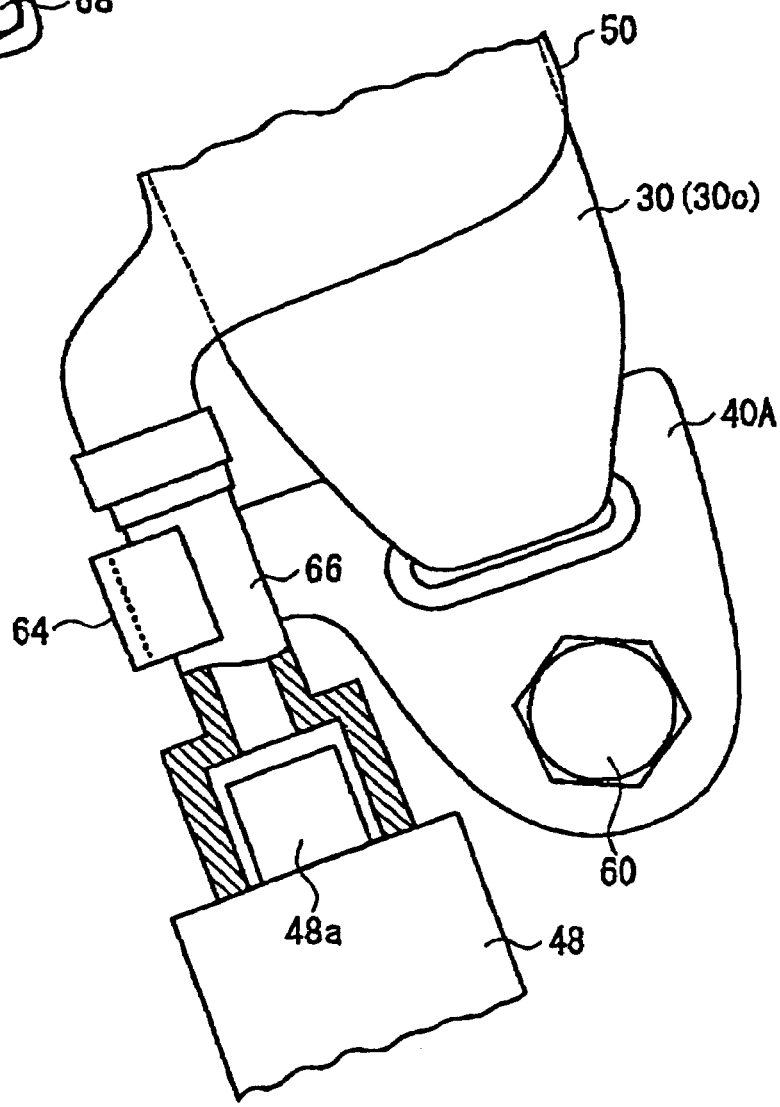
FIG. 6(b) is an enlarged view of a part of FIG. 6(a).

FIGS. 6(a) and 6(b) are diagrams showing a part around a lap anchor included in an occupant protection device according to another embodiment.

With reference to FIGS. 6(a) and 6(b), a lap anchor 40A is fixed to a base plate 42A by fixing means such as a bolt 60. A gas generator 48 is attached to the base plate 42A with a hook 62 provided on the base plate 42A. In addition, a bag-connection nozzle 66 is retained by a hook 64 provided on the lap anchor 40A. A bag 50 is connected to the nozzle 66 at the upper end of the nozzle 66, and a gas discharge hole 48a of the gas generator 48 is fitted to the nozzle 66 at the lower end of the nozzle 66.

The base plate 42A is fixed to a side frame member 10a by fixing means such as a bolt 68.

Modifications of the lap bag 50 will be described below with reference to FIGS. 8(a) to 10(b).

In FIGS. 8(a), 8(b), 9(a) and 9(b), each of lap bags 50A and 50B is folded along both sides of a lap portion 30a of a webbing 30. The lap bag 50A has a diameter smaller than that of the lap bag 50B in the inflated state, and is folded into four layers in total on both sides of the lap portion 30a, while the lap bag 50B is folded into six layers in total.

In FIGS. 10(a) and 10(b), a lap portion 30a is positioned inside a lap bag 50C.

In each of FIGS. 7 to 10, (a) shows the state in which the lap bag is not yet inflated, and (b) shows a sectional view of the lap bag in the inflated state.

In the above-described embodiments, the knit cover 52 inflates together with the lap bag 50, 50A, 50B, or 50C. However, the knit cover may also be configured to break when the lap bag inflate.

In addition, although the inflatable tube 20 is constructed by covering a tube-shaped inflatable bag with a tube-shaped mesh webbing in the above-described embodiments, the structure of the tube 20 is not limited to this. For example, in place of the mesh webbing, the bag may also be covered with a thin, plate-shaped cover material capable of deforming into a tube-like shape when the bag inflates. In addition, the cover, such as the mesh webbing, may also be omitted.

According to the present invention, the inflatable tube may also be disposed in the cushion pad.

What is claimed is:

1. An occupant protection system comprising:
    a vehicle seat having a base frame and a back frame extending upwardly from the base frame, a seat cushion and belt webbing for restraining an occupant on the seat;
    a seat airbag disposed below the seat cushion;
    opposite, side frame members of the base frame with the seat airbag extending therebetween;
    a tongue that generally divides the belt webbing into lap and shoulder portions;
    an inflatable lap belt airbag including a main portion that is disposed to extend along the belt lap portion that is not inflatable;
    first and second gas generators that are distinct from each other with one of the first and second gas generators operable to inflate the seat airbag and the other of the first and second gas generators operable to inflate the lap belt airbag;
    a lower anchor member connected to the belt lap portion at one of the side frame members of the seat base frame;
    a single retractor for both the lap and shoulder portions of the belt webbing with the single retractor being spaced from the lower anchor at the one side frame member of the seat base frame;
    a base plate member that is distinct from the lower anchor member, and being mounted to the one side frame member of the seat base frame and carrying both the other gas generator for inflating the lap belt airbag and the lower anchor member in side-by-side relation thereon so that the other gas generator is laterally offset from the lower anchor member and the belt lap portion connected thereto;
    a lower portion of the lap belt airbag that extends generally laterally from the lap belt airbag main portion to a free end of the lap belt airbag with the free end being disposed adjacent to and off of the belt webbing lap portion, extending down beyond the laterally extending, lap belt airbag lower portion, and being connected to the other gas generator;
    a gas supply path in the lap belt airbag lower portion extending generally laterally between the other gas generator carried on the base plate and the lap belt airbag main portion so that inflation gas flows from the other gas generator into the laterally offset lap belt airbag main portion;
    a buckle device mounted to the other side frame member so that with the tongue attached thereto, the belt webbing lap portion extends across the seat cushion and has a center approximately midway between the tongue and the lower anchor member; and
    a belt connecting end portion of the lap belt airbag opposite the free end thereof and directly connected to the belt webbing lap portion so that upon inflation of the lap belt airbag, the lap belt airbag expands transversely to the length of the belt webbing lap portion and contracts along the length of the belt webbing lap portion with the belt connecting end portion shifting to be at the same side of the center of the belt webbing lap portion as the free end thereof adjacent the one side frame member for pulling the belt webbing lap portion tightly against the seat occupant and also for providing the seat occupant with side impact protection.

2. The occupant protection system of claim 1 including gas flow paths, that include the gas supply path, between the generators and airbags separate from the buckle and tongue connection.

3. The occupant protection system of claim 1 wherein the base plate is pivotally mounted to the one side frame member of the seat base frame to allow the lower anchor member and the lap belt airbag gas generator to pivot together as the base plate pivots.

4. The occupant protection system of claim 1 wherein the lower anchor member is connected to a pretensioner.

5. The occupant protection system of claim 4 wherein the pretensioner is mounted to the base plate.

6. The occupant protection system of claim 1 wherein the buckle device for releasably receiving the tongue forms another anchor location for the belt webbing at the opposite side frame member of the seat base frame with the one gas generator being at mounted to the opposite side frame member of the seat base frame so that the first and second gas generators are on either side of the seat adjacent to or at the anchor locations.

7. An occupant protection device for a vehicle seat having opposite sides and a seat cushion, the occupant protection device comprising:
    a seat belt including only a single run of belt webbing for extending about the occupant;
    a buckle and tongue that have a releasable connection therebetween adjacent one of the opposite sides of the vehicle seat so that with the buckle and tongue in a releasably connected condition, the single run of belt webbing restrains an occupant on the seat, the tongue generally dividing the single run of belt webbing into shoulder and lap belt portions;
    a seat airbag for being inflated to push the seat cushion upwardly;
    a belt airbag mounted to the lap belt portion for being inflated to engage the occupant and push the occupant toward the seat;
    first and second gas generators that are operable to inflate the respective seat and belt airbags regardless of whether the buckle and tongue are in the connected condition thereof, with the first gas generator actuating only the seat airbag and no other occupant safety device, and the second gas generator actuating only the belt airbag and no other occupant safety device;
    a lap anchor member fixedly connected to the lap belt portion of the single run of belt webbing;
    a plate mounting member for being attached at the other one of the opposite sides of the vehicle seat; and a pretensioner secured to and carried on the plate mounting member below the lap anchor member and connected to the lap anchor member thereabove, the pretensioner having a body with an elongate configuration that extends in alignment with the lap anchor member and lap belt portion connected thereto, the elongate pretensioner body and the plate mounting member being sized so that the pretensioner body does not extend beyond the plate mounting member, and the pretensioner lacking a gas generator extending laterally to the elongate pretensioner body and beyond the plate mounting member so that the pretensioner does not require a force redirecting mechanism for redirecting pretensioning force generated by a laterally extending gas generator, with actuation of the pretensioner causing the lap anchor member to be pulled downwardly to apply tension to the lap belt portion to tightly engage the occupant with both the single run of belt webbing and the inflated belt airbag mounted thereto without the need for multiple runs of a lap belt.

8. The occupant protection device of claim 7 including a first gas flow path between the first gas generator and the seat airbag and a second gas flow path between the second gas generator and the belt airbag with both flow paths being separate and distinct from each other.

9. The occupant protection device of claim 7 wherein the buckle and tongue connection defines a first anchor at the one side of the vehicle seat, and the lap anchor member is a second anchor for the lap belt portion on the other side of the vehicle seat with the second gas generator mounted adjacent the second anchor.

10. The occupant protection system of claim 7 wherein the mounting member is a common mounting member to which both the second gas generator and the pretensioner are mounted.

11. The occupant protection system of claim 10 wherein the common mounting member is pivotally mounted to the other vehicle seat side.

12. The occupant protection system of claim 7 in combination with the vehicle seat having a base frame with the opposite sides of the vehicle seat including opposite side members of the base frame, and the first gas generator is mounted to one of the base frame side members and the second gas generator is mounted to the other of the base frame side members.

13. The combination of claim 12 wherein the buckle and tongue connection is mounted to the one base frame side member.

14. The combination of claim 13 wherein the mounting member is a common mounting member secured to the other side member of the base frame and to which both the pretensioner and the second gas generator are attached.

15. The combination of claim 14 wherein the common mounting member and the other side member have a pivot connection therebetween to allow for pivoting of the common mounting member and the lap anchor member, the pretensioner and the second gas generator attached thereto.

* * * * *